(12) United States Patent
Brusch et al.

(10) Patent No.: US 7,319,883 B2
(45) Date of Patent: Jan. 15, 2008

(54) METHOD AND APPARATUS FOR DETERMINING A TRANSMIT POWER

(75) Inventors: Simon Brusch, Swindon (GB); John Mathews, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 232 days.

(21) Appl. No.: 10/533,281

(22) PCT Filed: Oct. 6, 2003

(86) PCT No.: PCT/EP03/11175

§ 371 (c)(1),
(2), (4) Date: Apr. 28, 2005

(87) PCT Pub. No.: WO2004/056007

PCT Pub. Date: Jul. 1, 2004

(65) Prior Publication Data

US 2006/0099984 A1    May 11, 2006

(30) Foreign Application Priority Data

Dec. 18, 2002 (GB) .................................. 0229394.2

(51) Int. Cl.
*H04B 7/00* (2006.01)
*H04Q 7/20* (2006.01)

(52) U.S. Cl. .................. 455/522; 455/67.11; 455/69; 455/422.1; 455/446; 455/477

(58) Field of Classification Search ............. 455/67.11, 455/69, 422.1, 436, 443, 446, 477, 522
See application file for complete search history.

(56) References Cited

U.S. PATENT DOCUMENTS 5,901,355 A * 5/1999 Doner ........................ 455/447

6,760,566 B1 * 7/2004 Wright et al. ............... 455/13.4
2002/0187784 A1 * 12/2002 Tigerstedt et al. ........... 455/439
2002/0187811 A1 * 12/2002 Gerogiokas ................. 455/562

FOREIGN PATENT DOCUMENTS

EP         0 920 145 A       6/1999

* cited by examiner

*Primary Examiner*—Nay Maung
*Assistant Examiner*—Tuan H. Nguyen

(57) ABSTRACT

The invention relates to determining a transmit power in a cellular communication system comprising a cell including an inner zone served by a first carrier and an outer zone. A base station (201) comprises a receiver (211) for receiving measurement reports from communication units (203, 205, 207, 209). The measurement reports comprise receive characteristics such as receive signal levels. A distribution processor (217) generates a distribution of the receive characteristics, and a modified transmit power processor (219) determines a modified transmit power level in response to the distribution. Specifically, a modified transmit power level is determined as the power reduction of a transmit power that will result in a given traffic distribution between the inner zone and the outer zone. the modified transmit power processor (219) is coupled to a cell transmit power processor (225) which determines a cell transmit power associated with the first carrier in response to the modified transmit power level. Specifically a maximum transmit power of the first carrier is set to the cell transmit power level.

15 Claims, 3 Drawing Sheets

METHOD AND APPARATUS FOR DETERMINING A TRANSMIT POWER

FIELD OF THE INVENTION

The invention relates to a method and apparatus for determining a transmit power in a cellular communication system and in particular to determining a cell transmit power for a cell having an inner zone and an outer zone.

BACKGROUND OF THE INVENTION

FIG. 1 illustrates the principle of a conventional cellular communication system 100 in accordance with prior art. A geographical region is divided into a number of cells 101, 103, 105, 107 each of which is served by base station 109, 111, 113, 115. The base stations are interconnected by a fixed network which can communicate data between the base stations 109, 111, 113, 115. A mobile station is served via a radio communication link by the base station of the cell within which the mobile station is situated. In the example of FIG. 1, mobile station 117 is served by base station 109 over radio link 119, mobile station 121 is served by base station 111 over radio link 123 and so on.

As a mobile station moves, it may move from the coverage of one base station to the coverage of another, i.e. from one cell to another. For example mobile station 125 is initially served by base station 113 over radio link 127. As it moves towards base station 115 it enters a region of overlapping coverage of the two base stations 113 and 115 and within this overlap region it changes to be supported by base station 115 over radio link 129. As the mobile station 125 moves further into cell 107, it continues to be supported by base station 115. This is known as a handover or handoff of a mobile station between cells.

A typical cellular communication system extends coverage over typically an entire country and comprises hundreds or even thousands of cells supporting thousands or even millions of mobile stations. Communication from a mobile station to a base station is known as uplink, and communication from a base station to a mobile station is known as downlink.

The fixed network interconnecting the base stations is operable to route data between any two base stations, thereby enabling a mobile station in a cell to communicate with a mobile station in any other cell. In addition the fixed network comprises gateway functions for interconnecting to external networks such as the Public Switched Telephone Network (PSTN), thereby allowing mobile stations to communicate with landline telephones and other communication terminals connected by a landline. Furthermore, the fixed network comprises much of the functionality required for managing a conventional cellular communication network including functionality for routing data, admission control, resource allocation, subscriber billing, mobile station authentication etc.

Currently, the most ubiquitous cellular communication system is the $2^{nd}$ generation communication system known as the Global System for Mobile communication (GSM). GSM uses a technology known as Time Division Multiple Access (TDMA) wherein user separation is achieved by dividing frequency carriers into 8 discrete time slots, which individually can be allocated to a user. A base station may be allocated a single carrier or a multiple of carriers. One carrier is used for a pilot signal which further contains broadcast information. This carrier is used by mobile stations for measuring of the signal level of transmissions from different base stations, and the obtained information is used for determining a suitable serving cell during initial access or handovers. Further description of the GSM TDMA communication system can be found in 'The GSM System for Mobile Communications' by Michel Mouly and Marie Bernadette Pautet, Bay Foreign Language Books, 1992, ISBN 2950719007.

Currently, $3^{rd}$ generation systems are being rolled out to further enhance the communication services provided to mobile users. The most widely adopted $3^{rd}$ generation communication systems are based on Code Division Multiple Access (CDMA) wherein user separation is obtained by allocating different spreading and scrambling codes to different users on the same carrier frequency. The transmissions are spread by multiplication with the allocated codes thereby causing the signal to be spread over a wide bandwidth. At the receiver, the codes are used to de-spread the received signal thereby regenerating the original signal. Each base station has a code dedicated for a pilot and broadcast signal, and as for GSM this is used for measurements of multiple cells in order to determine a serving cell. An example of a communication system using this principle is the Universal Mobile Telecommunication System (UMTS), which is currently being deployed. Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

In order to optimise the capacity of a cellular communication system, it is important to minimise the impact of interference caused by or to other mobile stations. Thus, it is important to minimise the interference caused by the communication to or from a mobile station, and consequently it is important to use the lowest possible transmit power. As the required transmit power depends on the instantaneous propagation conditions, it is necessary to dynamically control transmit powers to closely match the conditions. For this purpose, the base stations and mobile stations operate power control loops, where the receiving end reports information on the receive quality back to the transmitting end, which in response adjusts it's transmit power. This ensures that the minimum transmit power necessary to ensure a given quality is used, and thus that interference caused by communication with each mobile station is minimised.

An important advantage of cellular communication systems is that, due to the radio signal attenuation with distance, the interference caused by communication within one cell is negligible in a cell sufficiently far removed, and therefore the resource can be reused in this cell. In GSM systems, carrier frequencies are therefore reused in other cells in accordance with a frequency plan. Frequency planning is one of the most important optimisation operations for a cellular communication system in order to maximise the communication capacity of the system. The frequency planning typically considers a vast number of parameters including propagation characteristics, traffic profiles and communication equipment capabilities.

One technique that has been used for optimisation of the capacity of cellular communication systems is allocate one or more carriers of a base station to support an inner zone of the cell and one or more carriers to support an outer zone. The carriers thus effectively form concentric cells within the cell. The outer zone carriers will communicate with mobile stations towards the cell edges and will therefore tend to transmit at relatively high transmit powers. These carriers therefore create a substantial interference in neighbouring cells and accordingly cannot be reused in these cells. However, the carriers supporting the inner zone will tend to communicate at a much reduced transmit power due to the shorter distance and thus typically shorter propagation path. Typically, the carriers associated with the inner zone have a lower maximum transmit power threshold thereby ensuring that interference to neighbouring cells is limited. Consequently, the carriers supporting the inner zone may have a much tighter re-use pattern and may typically be reused in neighbouring cells, thereby increasing the capacity of the communication system.

In order to optimise the traffic distribution between the inner zone and the outer zone, it is important to set the parameters of the associated carriers appropriately. Specifically, it is important to optimise the transmit power parameters of the inner zone carriers. Conventionally, the reduced transmit power of the inner zone carrier has been set to a fixed value expected to provide a reasonable result. In some cases, the fixed value has been adjusted by a trial and error approach until a suitable result has been achieved. However, the conventional method provides for an inflexible approach which is complex, cumbersome and requires substantial manual intervention. The approach furthermore results in a static setting of the parameters unsuitable for variations in the operating conditions. Furthermore, the reduced transmit power is determined based on historical data which may not be appropriate for the current conditions. Only rough estimates based on long term averaged traffic parameter values are generated thereby resulting in an increased probability of sub-optimal setting of the transmit power and consequently results in a reduced capacity of the communication system.

Hence, an improved system for determining a cell transmit power in a cell having an inner zone and an outer zone would be advantageous. In particular, a system allowing for increased flexibility, reduced complexity, increased accuracy, increased capacity and/or suitability for dynamic and/or automated implementation would be advantageous.

SUMMARY OF THE INVENTION

Accordingly, the Invention seeks to mitigate, alleviate or eliminate one or more of the above mentioned disadvantages singly or in any combination.

According to a first aspect of the invention there is provided a method of determining a transmit power in a cellular communication system comprising a first cell including an inner zone served by a first carrier and an outer zone served by a second carrier; the method comprising the steps of receiving measurement reports from a plurality communication units of the cell; the measurement reports comprising receive characteristics for a signal associated with the cell; generating a distribution of the receive characteristics; determining a modified transmit power level in response to the distribution of the receive characteristics; and determining a cell transmit power associated with the first carrier in response to the modified transmit power level.

The signal associated with the cell may for example be the signal of the first carrier, the second carrier or preferably both the first and second carrier as well as any other carriers of the cell. The cell transmit power is determined in response to actual measurements from the communication units thereby allowing for a determination based on the actual conditions in the cell rather than historical values or typical values. As the actual operating conditions of the cell are taken into account, an increased accuracy of the determination of the cell transmit power is enabled. The method is suited for automatic optimisation of the cell transmit power and a suitable value may be determined dynamically based on the current conditions. The method allows for a low complexity method of determining a suitable cell transmit power. Specifically, the cell transmit power may be a maximum transmit power threshold of the first carrier. All or some of the steps of the method may be iterated. Specifically, the method may be continuously iterated thereby allowing for a dynamic determination of the cell transmit power taking the current conditions into account. This allows for the cell transmit power to be continuously and automatically updated to reflect changes in the operating conditions. The inner zone and the outer zone may overlap or be non-contiguous. The inner zone may have areas further distant from the centre of the cell than areas of the outer zone. However, on average the outer zone will tend to be further removed from the centre of the cell than the inner zone.

According to a feature of the invention, the receive characteristics comprise signal receive levels. Preferably, the receive characteristics comprise receive signal levels indicative of the signal level at which carriers of the cell are received by the communication units. In an example of a GSM communication system, the RxLev reported in the measurement reports may be comprised in the receive characteristics. Receive signal levels are a suitable, reliable and/or accurate indication of the operating conditions in the cell. Typically, measurement reports comprise receive signal level characteristics for other purposes and thus no signalling overhead is introduced.

According to another feature of the invention, the receive characteristics comprise signal quality characteristics. Preferably, the receive characteristics comprise signal quality characteristics indicative of the quality at which carriers of the cell are received by the communication units. In an example of a GSM communication system, the RxQual reported in the measurement reports may be comprised in the receive characteristics. Signal quality characteristics are a suitable, reliable and/or accurate indication of the operating conditions in the cell. Typically, measurement reports comprise signal quality characteristics for other purposes and thus no signalling overhead is introduced.

According to another feature of the invention, the step of determining the modified transmit power comprises determining a modified transmit power level for which a ratio of receive characteristics of the distribution are above a receive characteristic threshold.

This allows for an efficient determination of a modified transmit power level that will achieve a given receive characteristics threshold for a ratio of communication units. The receive characteristics threshold may specifically be associated with a quality characteristic. It thus allows for determining a modified transmit power level for which a given quality level is achieved for a ratio of communication units. This provides for a low complexity method of determining a transmit power that will result in acceptable performance for a given ratio of communication units. Specifically, a transmit power of the first carrier may be determined that will achieve acceptable performance for a given ratio of communication units which may accordingly be supported in the inner zone. For example, the modified power may be determined as corresponding to the modified transmit power level.

According to another feature of the invention, the step of determining the ratio in response to a desired traffic ratio of the inner zone. This may allow for the ratio to be determined such that a desired traffic ratio for the inner zone is achieved by the determined modified transmit power. Hence, an efficient and low complexity method is enabled which may automatically determine a modified transmit power which will result in a desired traffic ratio of the inner cell.

According to another feature of the invention, the method further comprises the step of determining the ratio in response to a substantially full loading of the inner zone. This allows for a determination of a cell transmit power that will result in a substantially full loading of the first carrier thus reducing the loading of the second carrier and thereby increasing available resource over the whole cell area.

According to another feature of the invention, the method further comprises the step of determining the ratio in response to an average traffic of the cell and a number of carriers supporting the cell. For example the ratio may be determined such that the loading of carriers of the cell is similar hence allowing for a substantially equal distribution of the load between carriers.

According to another feature of the invention, the receive characteristic threshold is a predetermined receive characteristic threshold. This allows for a low complexity method of determining a receive characteristic threshold. The required receive characteristic threshold for a given quality level is typically known and has little sensitivity to the dynamic conditions. A predetermined receive characteristic threshold may thus be determined based on large amounts of data and complex algorithms without impacting the complexity or speed of execution of the current method.

According to another feature of the invention, the method further comprises the step of receiving a user input and setting the receive characteristic threshold in response to the user input. This allows for significant control of the method by a user. It provides a suitable means for enabling a user to experiment with different settings for the receive characteristic threshold.

According to another feature of the invention, the step of determining the receive characteristic threshold in response to a required quality level. A receive characteristic threshold may be determined that will achieve the required quality level for communication with the ratio of communication units. It allows for an automated method of determining the receive characteristic threshold which may take into account the current operating conditions and/or measured values.

According to another feature of the invention, the step of determining the receive characteristic threshold in response to a required interference level. This allows for a cell transmit power to be determined that may achieve a required interference level.

According to another feature of the invention, the step of determining the modified transmit power level comprises determining a receive characteristic reference value of the distribution corresponding to the ratio, and determining the modified transmit power level in response to the difference between the receive characteristic reference value and the receive characteristic threshold.

This allows for a simple and accurate method of determining the cell transmit power.

According to another feature of the invention, the step of generating the distribution comprises normalising the receive characteristics to a reference transmit power. Specifically, the variations in the transmit powers of different carriers of the cell may be compensated. This allows for the determination of the cell transmit power to be independent of the actual transmit power as well as transmit power variations of the carriers.

According to another feature of the invention, the step of generating a distribution comprises compensating the receive characteristics for a power control setting. Power control typically introduces a significant and fast changing transmit power variation. Compensating for this variation allows for an increased accuracy of the determination of the cell transmit power.

According to another feature of the invention, the power control loop comprises a fast power control loop and a slow power control loop and the compensation of the receive characteristics is associated with only the fast power control loop. This allows optimal cell transmit power to be determined independently of the response of slow power control to traffic loading.

According to another feature of the invention, the cell transmit power level is determined as the reference transmit power subtracted by the modified transmit power. This allows for a low complexity and accurate method of determining a cell transmit power.

According to another feature of the invention, the method further comprises the step of setting a transmit power of the first carrier to substantially the cell transmit power. The method may thus be used to control the transmit power associated with the inner zone and thus to control the size and/or traffic distribution of the inner zone. The inner zone may thus dynamically and automatically be adjusted to be suited for the current operating conditions and characteristics. This allows for an improved traffic distribution and reduced interference and accordingly an increased communication capacity of the entire communication system.

According to a second aspect of the invention, there is provided an apparatus for determining a transmit power in a cellular communication system comprising a first cell including an inner zone served by a first carrier and an outer zone served by a second carrier; the apparatus comprising: means for receiving measurement reports from a plurality communication units of the cell; the measurement reports comprising receive characteristics for a signal associated with the cell; means for generating a distribution of the receive characteristics; means for determining a modified transmit power level in response to the distribution of the receive characteristics; and means for determining a cell transmit power associated with the first carrier in response to the modified transmit power level.

These and other aspects and advantages of the invention will be apparent from and elucidated with reference to the embodiment(s) described hereinafter.

BRIEF DESCRIPTION OF THE DRAWINGS

An embodiment of the invention will be described, by way of example only, with reference to the drawings, in which.

DETAILED DESCRIPTION OF A PREFERRED EMBODIMENT OF THE INVENTION

The following description focuses on an embodiment of the invention applicable to a cellular communication system comprising a cell having an inner zone and an outer zone and in particular to a GSM cellular communication system. However, it will be appreciated that the invention is not limited to this application but may be applied to many other cellular communication systems including for example $3^{rd}$ Generation cellular communication systems.

Figure 1:
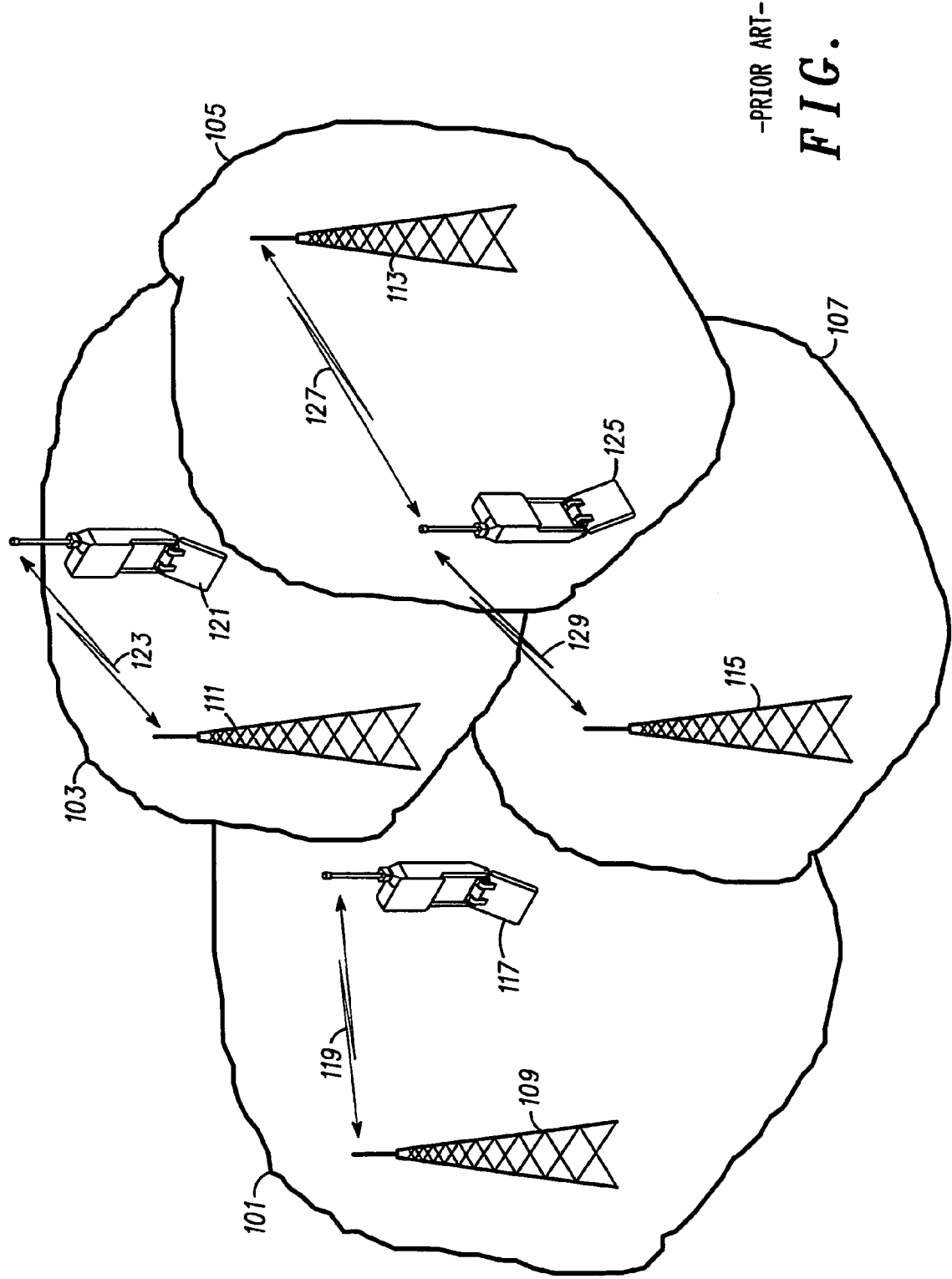
FIG. 1 is an illustration of a cellular communication system in accordance with the prior art.
Figure 2:
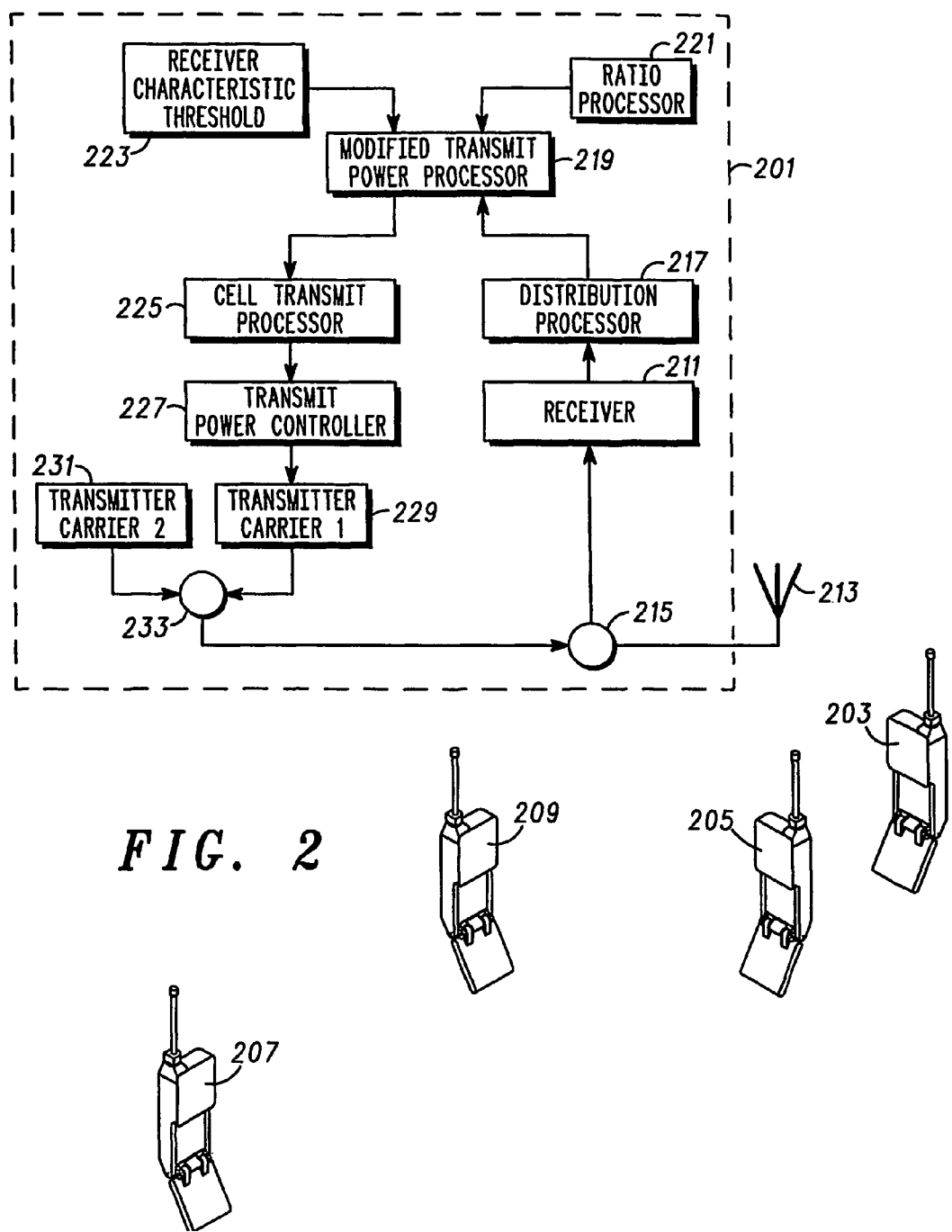
FIG. 2 is an illustration of apparatus for determining a transmit power in a cellular communication system in accordance with an embodiment of the invention.

FIG. 2 is an illustration of an apparatus for determining a transmit power in a cellular communication system in accordance with an embodiment of the invention. Specifically, FIG. 2 illustrates a base station comprising functional modules for determining a transmit power in accordance with an embodiment of the invention.

In the example of FIG. 2, a base station 201 is illustrated which supports a plurality of communication units 203, 205, 207, 209 in a cell. A communication unit may typically be a subscriber unit, a wireless user equipment, a mobile station, a communication terminal, a personal digital assistant, a laptop computer, an embedded communication processor or any communication element communicating over the radio interface. The base station 201 comprises a plurality of carriers of which a first carrier supports an inner zone and a second carrier supports an outer zone of the cell. The inner zone will tend to cover one or more areas close to the base station whereas the outer zone tends to cover one or more areas more distal from the base station. Specifically, the carrier supporting the outer zone may also support the area covered by the inner zone and thus may for example cover the whole cell. The inner zone thus effectively forms a concentric cell by the first carrier operating within the cell but at a reduced maximum transmit power level. Accordingly, the interference caused by the first carrier to other cells is substantially reduced and a tighter frequency reuse may be employed for this carrier frequency. Specifically, the frequency may be reused in neighbouring cells.

In the example of FIG. 2, two communication units 201, 203 are supported by the first carrier, which has a reduced maximum transmit power, and are therefore considered to be in the inner zone. Two other communication units 205, 207 are supported by the second carrier, which has a higher transmit power capability, and are therefore considered to be part of the outer zone.

The following description will for clarity and brevity focus on an embodiment wherein the base station 201 comprises only the first and second carrier. However, it will be apparent that the invention is equally applicable to base stations having a higher number of carriers. These carriers may for example comprise carriers for supporting inner zones, the full cell, predominantly outer zones or any other suitable allocation.

The base station 201 comprises a receiver coupled 211 to an antenna 213 through a duplexer 215. The duplexer 215 separates transmit and receives signals such that the same antenna can be used for both receiving and transmitting. The receiver 211 is a multi carrier receiver operable to receive signals on both the first and second carrier. During operation, the receiver 211 receives user data and control data from the communication units 203, 205, 207, 209 in accordance with the GSM communication standards.

It will be apparent, that the base station will comprise further functional modules for supporting conventional GSM communication, control and management functions, self testing etc. as is well known in the art.

Specifically, the receiver 211 receives measurement reports from the communication units 203, 205, 207, 209 of the cell. The measurement reports comprise a number of different parameters but specifically include receive characteristics such as the received signal level. Hence, for a GSM communication system, the communication units 203, 205, 207, 209 transmit measurement reports comprising an RxLev parameter which is an indication of the signal strength at which the current transmission from the base station 201 is received at.

The RxLev values of the received measurement reports are in the preferred embodiment fed to a distribution processor 217. The distribution processor 217 initially compensates for differences in the transmit power from the base station 201. Thus, the RxLev values are normalised to a reference transmit power which specifically may be the maximum possible transmit power of the first or second carrier. Hence, if an RxLev value corresponding to a receive signal level of −90 dBm has been received, and the transmit power resulting in this RxLev is 10 dB below the reference transmit power, the RxLev value is modified to correspond to a receive signal level −80 dBm.

The distribution processor 217 further generates a distribution of the compensated RxLev values. The distribution thus indicates the proportion of measurement values that have been received for different RxLev values.

The distribution processor 217 is coupled to a modified transmit power processor 219. The modified transmit power processor 219 receives the distribution from the distribution processor 217 and in response determines a modified transmit power level. Specifically, the modified transmit power processor 219 first determines an RxLev reference value that a given ratio of the compensated RxLev values are above. The modified transmit power processor 219 is coupled to a ratio processor 221 from which the ratio is received. In a simple embodiment, the ratio is a simple predetermined ratio set to a value corresponding to the ratio of the communication units in the cell that are desired to be supported by the first carrier, i.e. to be considered in the inner zone.

The modified transmit power processor 219 is further coupled to a receive characteristic threshold processor 223. The receive characteristic threshold processor 223 determines a lower threshold for the receive characteristics that is considered to be acceptable. In the specific example, the RxLev threshold that corresponds to an acceptable receive level at the communication units is determined. In a simple embodiment, this is a predetermined value and the receive characteristic threshold processor 223 may simply be in the form of a memory element comprising this value.

The modified transmit power processor 219 proceeds to determine the modified transmit power level as the difference between the RxLev reference value and the RxLev threshold. The modified transmit power level is thus an indication of the magnitude of the receive signal margin for the desired ratio of the communication units.

The modified transmit power processor 219 is coupled to a cell transmit power processor 225. The cell transmit power processor 225 determines a maximum transmit power for the first carrier based on the modified transmit power level. Specifically, it determines the maximum transmit power as the reference transmit power reduced by the modified transmit power level, i.e. reduced by the receive signal margin for the ratio of the communication units. Hence, for this maximum transmit power, the ratio of measurement reports having RxLevs above the RxLev threshold is substantially equal to the ratio determined by the ratio processor. Accordingly, a desired ratio of communication units can be supported by the first carrier with acceptable performance, whereas the remaining communication units must be supported by the second carrier. Hence, a maximum transmit power is determined which will result in a desired ratio of communication units being supported by the first carrier.

The cell transmit power processor 225 is coupled to a transmit power controller 227. The transmit power controller 227 is coupled to a first carrier transmitter 229 which is operable to transmit signals on the first carrier. The transmit power controller 227 controls the transmit power of the first carrier transmitter 229 and specifically limits the transmit power to that of the maximum transmit power determined by the cell transmit processor 225.

The first carrier transmitter 229 is coupled to a combiner 231, which combines the transmit signal of the first carrier transmitter 229 with that of a second carrier transmitter 233. The second carrier transmitter 233 is operable to transmit the signal of the second carrier. The combined signal is via the duplexer 215 fed to the same antenna 213.

Hence, in accordance with this embodiment, the distribution of communication units between the first and second carrier may automatically be controlled by directly setting a desired ratio of communication units for the first carrier. The base station may continuously update the maximum transmit power to reflect changing operating conditions. The operation is further well suited for automatic updating and is simple and efficient to implement.

Figure 3:
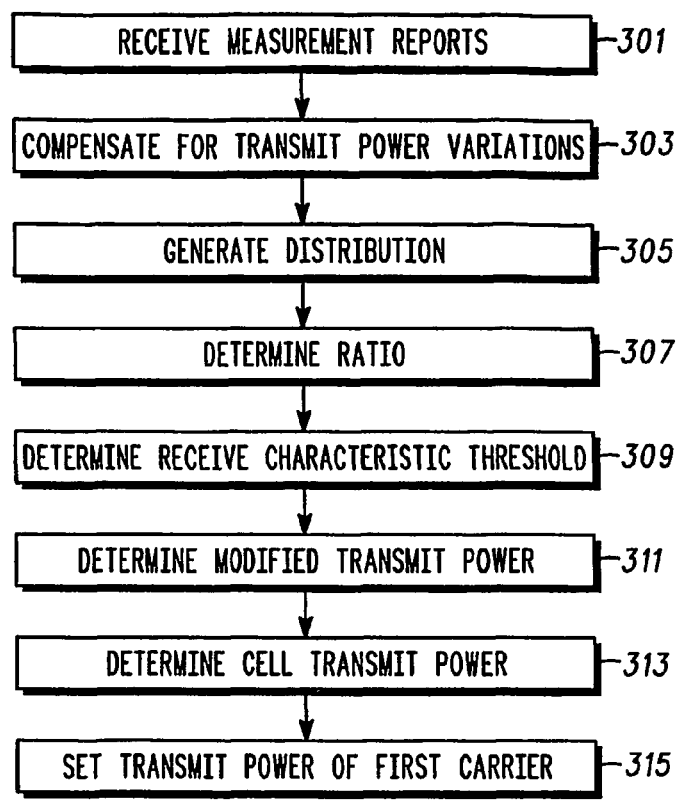
FIG. 3 illustrates the flowchart of a method of determining a transmit power in accordance with an embodiment of the invention.

FIG. 3 illustrates the flowchart of a method of determining a transmit power in accordance with an embodiment of the invention. The method is applicable to the previous example of a base station. It will be apparent, that the method may be applicable to many other implementations including for example as an automated tool for facilitating semi-automated frequency planning operations. The following description will mainly describe the method with reference to the base station of FIG. 2.

In step 301, measurement reports are received from a plurality of communication units of the cell. In some embodiments, such as for example a non-real time frequency planning programme, this step may comprise receiving one or more data files comprising information related to collated measurement reports for the cell. The measurements will in the preferred embodiment comprise receive characteristics related to the operating characteristics of the individual communication units, and specifically to the operating characteristics associated with the receipt of the signal from the base station of the cell. In the preferred embodiment, the measurement reports comprise signal receive levels, such as RxLev values for a GSM communication system, and/or signal quality characteristics, such as RxQual values for a GSM communication system.

In the preferred embodiment, measurement reports are received for all the communication units of a cell of the communication system. Hence, in the preferred embodiment, the measurement reports originate from communication units being served by the first carrier, the second carrier and indeed any other carrier of the base station.

Step 301 is followed by step 303. In step 303, the receive characteristics of the measurement reports are normalised to a reference transmit power. The transmit power of the different carriers may be different, and the transmit power of each carrier may furthermore vary in time due to the effect of the power control loop. Hence, the receive characteristic values are compensated to correspond to the receive characteristics that would have been received, had the transmit power of the signal been the reference transmit power.

Specifically, the power control setting for a specific signal transmitted to a specific communication unit is known at the base station. The receive characteristic(s) of the corresponding measurement report is thus compensated by the difference between the transmit power for that power control setting and the reference transmit power. For example, if the reference transmit power is set to a maximum possible transmit power level of for example 40 dBm, and the power control setting has reduced the transmit power to 30 dBm, the receive signal level of that measurement report is increased by a value corresponding to 10 dB. In other embodiments, a simple linear compensation may not be appropriate. For example, the bit error rate depends non-linearly on the signal to noise ratio and thus the transmit power. In this case, more complex compensation functions may be used, and specifically a predetermined look up table may be used to compensate the receive characteristics.

In some cellular communication systems, a fast and a slow power control is operated, wherein the fast power control is used to compensate for fast variations in the propagation conditions, and the slow power control is used to control the quality of service level. In some embodiments, the compensation may only be of the fast power control loop and not of the slow power control loop. This provides the advantage of determining the optimal cell transmit power independently of the response of slow power control to non-radio effects. This independence is based on the reasonable assumption that the cell is not transmit power limited, and hence the measurements reported by the communications units are representative of the radio propagation conditions only.

Step 303 is followed by step 305. In step 305, a distribution of the receive characteristics is generated. In the preferred embodiment, a cumulative distribution of the receive characteristics is generated.

Figure 4:
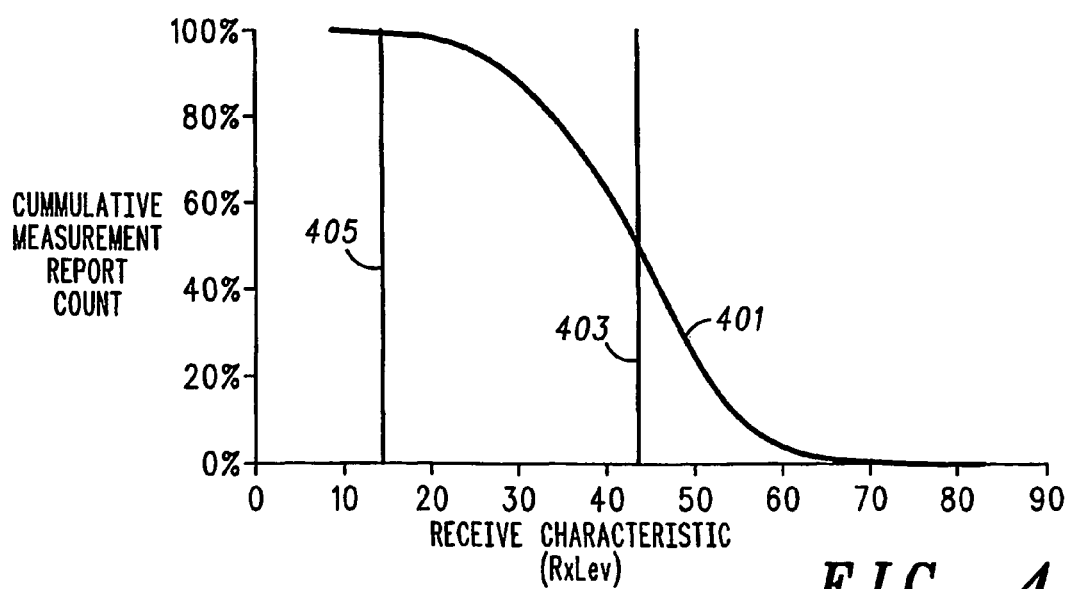
FIG. 4 illustrates an example of a distribution of receive signal levels.

FIG. 4 illustrates an example of a distribution of receive signal levels (specifically RxLevs). The vertical axis corresponds to the cumulative number of measurement reports (in %) and the horizontal axis corresponds to the receive signal level given in terms of RxLev values. The curve 401 corresponds to the ratio of measurement reports that have a compensated RxLev above that level. Hence, for the specific example of FIG. 4, 52% of the measurement reports comprise an RxLev of 43 or above.

It will be apparent that the distribution may be of any suitable receive characteristic. For example, instead of the receive signal level characteristic of RxLev, the quality characteristic of RxQual may be used.

Step 305 is followed by step 307. In step 307, a desired ratio of measurement reports that will result in a suitable distribution of communication units between the inner and outer zone is determined. The ratio is accordingly used in later steps to divide the distribution into a part corresponding to the inner zone and one corresponding to the outer zone.

In the preferred embodiment, a desired traffic ratio of the inner zone is determined. For example, it may be desired that 50% of all communication units should preferably be allocated to the inner zone. In most systems, it is a reasonable assumption that the measurement reports varies significantly more between communication units than with time for the same communication unit. It is therefore a reasonable approach to set a desired ratio of measurement reports equivalently to the desired traffic ratio. Hence, the ratio determined in step 305 may specifically be the same ratio as the desired traffic ratio of the inner cell.

In other embodiments, the ratio may be set to correspond to a substantially full loading of the inner zone. Hence, the maximum possible loading for the inner zone is determined and the corresponding number of measurement reports set accordingly. For example, if the inner zone is supported by two carriers where each has a capacity of eight communication units, and the distribution comprises 10 measurement reports from each active communication unit, the ratio may be set at 160 measurement reports divided by the total amount of measurement reports of the distribution.

In another embodiment, the ratio may be set in response to an average traffic of the cell and the number of carriers supporting the cell. The ratio may thus be set such that the load is distributed equally over the different carriers. For example, if the cell is supported by two carriers for the inner zone and two carriers for the outer zone, a ratio of 50% may be set thus allowing for a similar loading of the inner and outer zone.

Step 307 is followed by step 309. In step 309, a receive characteristic threshold is determined. In the preferred embodiment, the receive characteristic threshold is a lower threshold value for supporting a reliable communication. For example, for GSM it is generally considered that a receive signal level corresponding to an RxLev of 15 or higher is required for reliable communication. If the receive level drops below this value, a handover, known as an RxLev handover, is normally instigated.

In the preferred embodiment, the receive characteristic threshold is a predetermined receive characteristic threshold, and step 309 may simple consist in retrieving the predetermined value from a memory location. The value may thus simply be a lower threshold defined in the standards as a minimum threshold before a handover should be instigated. In other embodiments, the receive characteristics threshold may be fed to the method as a user input. In this embodiment, a user operating the method may enter a given minimum threshold.

In other embodiments, more complex methods may be used for determining the receive characteristic threshold. In one embodiment, the receive characteristic threshold may be determined in response to a required quality level. For example, a given bit error rate may be required and the receive characteristic threshold may be determined as the lowest receive characteristic value that will achieve this. This may for example be the receive level that for a given interference assumption ensures that the received signal to noise ratio is sufficient to result in a required bit error rate.

Alternatively or additionally, the receive characteristic threshold may be determined in response to a required interference level. For example, to determine the cell transmit power for other coding schemes which have different required receive characteristics.

Step 309 is followed by step 311. In step 311, a modified transmit power level is determined in response to the distribution of the receive characteristics, the receive level threshold and the desired ratio of measurement reports.

Specifically, a receive characteristic reference value corresponding to the desired ratio is determined. For the specific example of FIG. 4, a desired ratio of 50% is seen to correspond to an RxLev reference value 403 of slightly less than 43. Furthermore, an RxLev receive level threshold 405 of 15 is shown. This is considered to be a lower threshold for acceptable performance. Accordingly, for 50% of the measurement reports, the reference transmit power results in a margin of at least the difference between the receive levels corresponding to RxLev 43 and RxLev 15. This corresponds to a margin of 28 dB. In the preferred embodiment, the modified transmit power level is determined as this margin. Hence, the modified transmit power level may be given as:

modified transmit power level=receive characteristic reference value·receive level threshold Step 311 is followed by step 313. In step 313, a cell transmit power associated with the first carrier is determined in response to the modified transmit power level. Specifically, a maximum transmit power value of the first carrier is set in response to the modified transmit power level.

In the preferred embodiment, the cell transmit power is set such that the desired ratio of measurement reports are above the receive characteristic threshold. Specifically, the cell transmit power level of all carriers supporting the inner zone is determined as the reference transmit power subtracted by the modified transmit power. Accordingly, the maximum transmit power of the first carrier will in the specific example be sufficient to result in 50% of the measurement reports having RxLevs of 15 or above. Accordingly, around 50% of the communication units may be supported by the inner zone carriers.

In the preferred embodiment, step 313 is followed by 315 wherein the maximum transmit power of the first carrier is set to the cell transmit power determined in step 313.

Accordingly, the method allows for a simple approach to setting parameters associated with the inner cell such that it results in a desired traffic distribution and/or loading of the cell. Specifically, the distribution between the inner zone and the outer zone may automatically be determined based on measurements of the actual current operating conditions. Hence, a dynamic update of parameters is enabled. The approach furthermore results in improved accuracy and improved allocation of communication units between the inner zone and the outer zone thereby increasing the communication capacity of the cellular communication system. The method is furthermore suited for automated or semi-automated optimisation.

The invention can be implemented in any suitable form including hardware, software, firmware or any combination of these. However, preferably, the invention is implemented as software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with the preferred embodiment, it is not intended to be limited to the specific form set forth herein. Rather, the scope of the present invention is limited only by the accompanying claims. In the claims, the term comprising does not exclude the presence of other elements or steps. Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. In addition, singular references do not exclude a plurality. Thus references to "a", "an", "first", "second" etc do not preclude a plurality.

The invention claimed is:

1. A method of determining a transmit power in a cellular communication system comprising a first cell including an inner zone served by a first carrier and an outer zone served by a second carrier; the method comprising the steps of:

receiving measurement reports from a plurality of communication units of the cell; the measurement reports comprising receive characteristics for a signal associated with the cell;

generating a distribution of the receive characteristics by normalising the receive characteristics to a reference transmit power and compensating the receive characteristics for a power control loop;

determining a modified transmit power level in response to the distribution of the receive characteristics; and determining a cell transmit power associated with the first carrier as the reference transmit power subtracted by from the modified transmit power level.

2. A method as claimed in claim 1 wherein the receive characteristics comprise signal receive levels.

3. A method as claimed in claim 1 wherein the receive characteristics comprise signal quality characteristics.

4. A method as claimed in claim 1 wherein the step of determining the modified transmit power level comprises determining a modified transmit power level for which a ratio of receive characteristics of the distribution are above a receive characteristic threshold.

5. A method as claimed in claim 4 further comprising the step of determining the ratio in response to a desired traffic ratio of the inner zone.

6. A method as claimed in claim 4 further comprising the step of determining the ratio in response to a substantially full loading of the inner zone.

7. A method as claimed in claim 4 further comprising the step of determining the ratio in response to an average traffic of the cell and a number of carriers supporting the cell.

8. A method as claimed in claim 4 wherein the receive characteristic threshold is a predetermined receive characteristic threshold.

9. A method as claimed in claim 4 further comprising the step of receiving a user input and setting the receive characteristic threshold in response to the user input.

10. A method as claimed in claim 4 further comprising the step of determining the receive characteristic threshold in response to a required quality level.

11. A method as claimed in claim 1 further comprising the step of determining the receive characteristic threshold in response to a required interference level.

12. A method as claimed in claim 1 wherein the step of determining the modified transmit power level comprises determining a receive characteristic reference value of the distribution corresponding to the ratio, and determining the modified transmit power level in response to the difference between the receive characteristic reference value and the receive characteristic threshold.

13. A method as claimed in claim 1 wherein the power control loop comprises a fast power control loop and a slow power control loop and the compensation of the receive characteristics is associated with only the fast power control loop.

14. A method as claimed in claim 1 further comprising the step of setting a transmit power of the first carrier to substantially the cell transmit power.

15. An apparatus for determining a transmit power in a cellular communication system comprising a first cell including an inner zone saved by a first carrier and an outer zone served by a second carrier; the apparatus comprising:

means for receiving measurement reports from a plurality of communication units of the cell; the measurement reports comprising receive characteristics for a signal associated with the cell;

means for generating a distribution of the receive characteristics by normalising the receive characteristics to a reference transmit power and compensating the receive characteristics for a power control loop;

means for determining a modified transmit power level in response to the distribution of the receive characteristics; and means for determining a cell transmit power associated with the first carrier as the reference transmit power subtracted by from the modified transmit power level.

* * * * *

UNITED STATES PATENT AND TRADEMARK OFFICE
CERTIFICATE OF CORRECTION

PATENT NO. : 7,319,883 B2  Page 1 of 1
APPLICATION NO. : 10/533281
DATED : January 15, 2008
INVENTOR(S) : Brusch et al.

It is certified that error appears in the above-identified patent and that said Letters Patent is hereby corrected as shown below:

Column 14, Line 19, in Claim 15, delete "saved" and insert -- served --, therefor.

Signed and Sealed this

Second Day of June, 2009

JOHN DOLL
*Acting Director of the United States Patent and Trademark Office*